US011204489B2

(12) United States Patent
Kleppe et al.

(10) Patent No.: US 11,204,489 B2
(45) Date of Patent: Dec. 21, 2021

(54) HIGH-RESOLUTION SCANNING MICROSCOPY WITH DISCRIMINATION BETWEEN AT LEAST TWO WAVELENGTH RANGES (71) Applicant: Carl Zeiss Microscopy GmbH, Jena (DE)

(72) Inventors: Ingo Kleppe, Jena (DE); Ralf Netz, Jena (DE); Yauheni Novikau, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 31 days.

(21) Appl. No.: 15/502,187

(22) PCT Filed: Aug. 5, 2015

(86) PCT No.: PCT/EP2015/068113
§ 371 (c)(1),
(2) Date: Feb. 6, 2017

(87) PCT Pub. No.: WO2016/020459
PCT Pub. Date: Feb. 11, 2016

(65) Prior Publication Data
US 2017/0227749 A1   Aug. 10, 2017

(30) Foreign Application Priority Data
Aug. 6, 2014 (DE) .......................... 102014111167.2

(51) Int. Cl.
*G02B 21/36* (2006.01)
*G02B 21/00* (2006.01)
(Continued)

(52) U.S. Cl.
CPC ..... *G02B 21/0072* (2013.01); *G01N 21/6458* (2013.01); *G02B 21/008* (2013.01);
(Continued)

(58) Field of Classification Search
CPC .................................................. G02B 21/365
See application file for complete search history.

(56) References Cited

U.S. PATENT DOCUMENTS

| 5,043,570 A | 8/1991 | Takabayashi |
| 5,866,911 A | 2/1999 | Baer |

(Continued)

FOREIGN PATENT DOCUMENTS

| DE | 43 24 681 A1 | 3/1995 |
| DE | 44 16 558 C2 | 9/1997 |

(Continued)

OTHER PUBLICATIONS

Hell, Stefan W., "Far-Field Optical Nanoscopy," *Science*, vol. 316, pp. 1153-1158 (May 25, 2007).
(Continued)

*Primary Examiner* — Y Lee
(74) *Attorney, Agent, or Firm* — Christensen, Fonder, Dardi & Herbert PLLC (57) ABSTRACT

A microscopy high-resolution scanning method, including exciting a sample with illumination radiation focused at a point to form a diffraction-limited illumination spot so as to emit fluorescence radiation. The point is imaged in a diffraction image on a spatially resolving two-dimensional detector. The sample is scanned at scanning positions with increments that are smaller than half the diameter of the spot. An image of the sample with a resolution increased beyond a resolution limit of the image is generated from the data of the two-dimensional detector and the scanning positions. To discriminate between at least two predetermined wavelength ranges in the fluorescence radiation of the sample, Airy disks corresponding to the wavelength ranges are generated on the two-dimensional detector, the Airy disks being offset laterally from one another such that the diffraction image consists of the mutually offset Airy disks.
(Continued)

The Airy disks are evaluated when generating the sample image.

13 Claims, 3 Drawing Sheets

(51) Int. Cl.
  *G02B 27/58* (2006.01)
  *G01N 21/64* (2006.01)
(52) U.S. Cl.
  CPC ..... *G02B 21/0032* (2013.01); *G02B 21/0076* (2013.01); *G02B 27/58* (2013.01)

(56) References Cited

U.S. PATENT DOCUMENTS

| | | | |
|---|---|---|---|
| 5,867,604 | A | 2/1999 | Ben-Levy et al. |
| 6,633,432 | B2 | 10/2003 | Iketaki |
| 6,909,105 | B1 | 6/2005 | Heintzmann et al. |
| 8,705,172 | B2 | 4/2014 | Kleppe et al. |
| 2004/0182710 | A1 | 9/2004 | Tanaami |
| 2008/0158556 | A1 | 7/2008 | Suzuki et al. |
| 2009/0116008 | A1 | 5/2009 | Fukuda et al. |
| 2010/0294949 | A1 | 11/2010 | Sasaki et al. |
| 2011/0160083 | A1 | 6/2011 | Hell et al. |
| 2011/0267688 | A1 | 11/2011 | Kleppe et al. |
| 2013/0037729 | A1 | 2/2013 | Hell |
| 2013/0222567 | A1 | 8/2013 | Kalkbrenner et al. |
| 2014/0146376 | A1 | 5/2014 | Kleppe et al. |
| 2014/0287941 | A1 | 9/2014 | Betzig et al. |
| 2014/0293037 | A1 | 10/2014 | Kleppe et al. |
| 2015/0008309 | A1 | 1/2015 | Wolleschensky et al. |
| 2015/0077842 | A1 | 3/2015 | Kleppe et al. |
| 2015/0077843 | A1 | 3/2015 | Huhse |
| 2015/0077844 | A1 | 3/2015 | Singer et al. |
| 2015/0085099 | A1 | 3/2015 | Kleppe et al. |
| 2015/0185454 | A1 | 7/2015 | Kalkbrenner et al. |
| 2015/0378141 | A1 | 12/2015 | Bathe et al. |
| 2016/0131883 | A1 | 5/2016 | Kleppe et al. |
| 2016/0246042 | A1 | 8/2016 | Enderlein et al. |
| 2016/0267658 | A1 | 9/2016 | Kleppe et al. |

FOREIGN PATENT DOCUMENTS

| | | |
|---|---|---|
| DE | 103 25 460 A1 | 11/2004 |
| DE | 10 2006 021 317 B3 | 10/2007 |
| DE | 10 2010 028 138 A1 | 10/2011 |
| DE | 10 2012 201 286 A1 | 8/2013 |
| DE | 10 2012 204 128 A1 | 9/2013 |
| DE | 10 2012 023 024 A1 | 5/2014 |
| DE | 10 2013 001 238 A1 | 7/2014 |
| DE | 10 2013 005 563 A1 | 10/2014 |
| DE | 10 2013 019 347 A1 | 2/2015 |
| DE | 10 2013 019 348 A1 | 2/2015 |
| DE | 10 2013 015 931 A1 | 3/2015 |
| DE | 10 2013 015 932 A1 | 3/2015 |
| DE | 10 2013 015 933 A1 | 3/2015 |
| DE | 10 2013 017 468 A1 | 3/2015 |
| DE | 10 2013 218 795 A1 | 3/2015 |
| DE | 10 2013 017 124 A1 | 4/2015 |
| EP | 2 253 983 A2 | 11/1990 |
| EP | 1 055 925 A2 | 11/2000 |
| EP | 1 157 297 B1 | 11/2002 |
| EP | 2 037 255 A1 | 3/2009 |
| EP | 2 317 362 A1 | 5/2011 |
| WO | WO 02/14811 A1 | 2/2002 |
| WO | WO 2006/127692 A2 | 11/2006 |
| WO | WO 2013/135487 A1 | 9/2013 |
| WO | WO 2014/114702 A1 | 7/2014 |

OTHER PUBLICATIONS

Neher, R., et al., "Optimizing imaging parameters for the separation of multiple labels in a fluorescence image," *Journal of Microscopy*, vol. 213, pp. 46-62 (Jan. 1, 2004).

http://en.wikipedia.org/wiki/Wiener_deconvolution.

Zimmermann, Timo, "Spectral Imaging and Linear Unmixing in Light Microscopy," *Adv Biochem Engin/Biotechnol*, vol. 25, pp. 245-265 (2005).

HIGH-RESOLUTION SCANNING MICROSCOPY WITH DISCRIMINATION BETWEEN AT LEAST TWO WAVELENGTH RANGES

PRIORITY CLAIM

The present application is a National Phase entry of PCT Application No. PCT/EP2015/068113, filed Aug. 5, 2015, which claims priority from German Patent Application Number 102014111167.2, filed Aug. 6, 2014, the disclosures of which are hereby incorporated by reference herein in their entirety.

FIELD OF THE INVENTION

The invention relates to a method for high-resolution scanning microscopy of a sample, wherein the sample is excited by illumination radiation to emit fluorescent radiation, wherein the illumination radiation is focused to a point in or on the sample to form a diffraction-limited illumination spot, the point is imaged to a diffraction image on a spatially resolving two-dimensional detector in diffraction-limited manner, wherein the two-dimensional detector has a spatial resolution which resolves a diffraction structure of the diffraction image, the point is displaced into various scanning positions relative to the sample with an increment which is smaller than half a diameter of the illumination spot, the two-dimensional detector is read and an image of the sample with a resolution which is increased beyond a resolution limit of the imaging is generated from data of the two-dimensional detector and from the scanning positions assigned to these data.

The invention further relates to a microscope for high-resolution scanning microscopy, the microscope comprising a sample space for receiving a sample which can be excited to emit fluorescent radiation, a lens system comprising a focal plane lying in the sample space and a resolution limit, an illumination device comprising an input for receiving illumination radiation and illuminating the sample space with the illumination radiation via the lens system in wherein that the lens system focuses the illumination radiation to a diffraction-limited illumination spot, at a point in the focal plane an imaging apparatus for imaging the point in the focal plane to a diffraction-limited manner through the lens system to a diffraction image on a spatially resolving two-dimensional detector which lies in a detector plane conjugate with the focal plane, wherein the two-dimensional detector has a spatial resolution which resolves a diffraction structure of the diffraction image, a scanning device for displacing the point into various scanning positions with an increment which is smaller than half a diameter of the illumination spot, an evaluation device for reading the two-dimensional detector, for evaluating the diffraction structure of the diffraction image from data of the two-dimensional detector and from the scanning positions assigned to these data and for generating an image of the sample with a resolution which is increased beyond the resolution limit.

BACKGROUND OF THE INVENTION

A classical field of application of light microscopy for examining biological specimens is luminescence microscopy. Here, particular dyes (so-called phosphors or fluorophores) are used for specific labelling of samples, e.g., of parts of cells. The sample is illuminated with illumination radiation representing excitation radiation and the luminescent radiation excited thereby is detected with suitable detectors. By this procedure it is possible to resolve individual, differently dyed parts of cells in the microscope. Of course, several parts of a specimen can also be stained at the same time with different dyes binding specifically to different structures of the specimen. This method is referred to as multiple luminescence. Samples can also be surveyed which luminesce per se, therefore without the addition of a dye.

Here, as is generally the case, luminescence is understood as a generic term for phosphorescence and fluorescence and therefore includes any of both processes. Where fluorescence is referred to here, this is pars pro toto and is not to be understood as limiting.

For examining samples, it is also known to use laser scanning microscopes (also abbreviated to LSM) which image only that plane which is located in the focal plane of the objective by means of a confocal detection arrangement (then it is called a confocal LSM) or a non-linear sample interaction (so-called multiphoton microscopy). A section is obtained optically and recording several sections at different depths of the sample enables a three-dimensional image of the sample to be generated which is composed of the different optical sections. Laser scanning microscopy is thus suitable for the examination of thick specimens. Of course, a combination of luminescence microscopy and laser scanning microscopy is also used in which a luminescent sample is imaged in different depth planes with the aid of an LSM.

In principle, the optical resolution of a light microscope, including that of an LSM, is diffraction-limited by the laws of physics. The term "high-resolution" is used here for resolutions beyond the diffraction limit.

U.S. Pat. No. 5,043,570 describes an attempt to increase the resolution by "oversampling". This does not lead to a considerably improved resolution below the diffraction limit of the microscope.

With the aid of non-linear depopulation processes, the resolution can be increased by a factor of up to 10 compared with a diffraction-limited confocal LSM. Such a method is described for example in U.S. Pat. No. 5,866,911. Different approaches are known for the depopulation processes as described, for example, in DE 4416558 C2, U.S. Pat. No. 6,633,432 or DE 10325460 A1.

A further high-resolution microscopy method is discussed in U.S. Pat. No. 5,867,604, in which an object is scanned by a periodic structure. A similar method for increasing the resolution is discussed in EP 1157297 B1. Structured illumination uses non-linear processes, e.g., saturation of the fluorescence. The approach requires a reconstruction algorithm for image generation and the utilization of several captures for an image.

A method which achieves a high resolution in the widefield is known from WO 2006127692 and DE 102006021317. This method, abbreviated to PALM (Photo Activated Light Microscopy), uses a labelling substance which can be activated by means of an optical activation signal. The labelling substance can only be excited by excitation radiation to emit particular fluorescent radiation in the activated state. The activation is performed in such a way that at least a certain proportion of the activated label molecules are spaced apart from neighbouring activated molecules in such a way that these label molecules are separated discriminated or can be subsequently discriminated within the optical resolution of the microscopy. After capturing the luminescent radiation, the center of the radiation distribution of these isolated molecules generated due to the resolution limit is then determined and the position of the molecules is calculated therefrom with a higher degree of accuracy than is actually permitted by the optical imaging. For imaging of an entire sample, the isolation of the label molecules of a subset by introducing the activation radiation, subsequent excitation and fluorescent radiation imaging is repeated until as far as possible all of the label molecules were included in a subset once and had been isolated.

Further high-resolution methods are described in Hell, "Far-Field Optical Nanoscopy", Science 316, 1153-1158, 2007.

A method and microscope of the type mentioned initially are known from EP 2317362 A1. This publication combines, in the embodiment shown and described there in FIG. 5, a diffraction-limited illumination of the sample with a two-dimensional detector, wherein a scanning device is adapted such that the diffraction image of the point illuminated by the illumination spot does not move on the two-dimensional detector. This arrangement is referred to as a so-called "de-scanned" detector arrangement. It is usually achieved by arranging a scanner, which deflects the beam path, between the sample and a merging point of illumination device and the imaging device. Such scanner then acts both on the illumination spot and on the diffraction-limited image of the point illuminated by the illumination spot with the result that the beam path in the imaging direction after the scanner is not moving. An alternative to such scanner is a movable sample stage which shifts the sample. Then too, the diffraction image does not move on the two-dimensional detector. In the approach of EP 2317362 A1, the two-dimensional detector is provided with a spatial resolution which, in terms of image magnification, oversamples the diffraction image and thus resolves the diffraction structure of the diffraction image.

EP 2317362 A1 provides an embodiment in which a color analysis is possible. For this, several detectors are provided which lie in corresponding spectral channels which are formed by a dichroic color splitter. This approach has been known for some time from laser scanning microscopy. However, it has the disadvantage that one color splitter with corresponding detector is needed for each color channel. In the case of conventional laser scanning microscopy, which uses a non-spatially resolving detector behind a confocal pinhole diaphragm (so-called pinhole), this requirement is largely unproblematical; in the case of an oversampling two-dimensional detector according to EP 2317362 A1 a considerable cost arises, however, especially because such two-dimensional detectors are expensive. In addition, in the oversampling principle according to EP 2317362 A1, these several two-dimensional detectors would have to be aligned with each other accurately to a subpixel level since otherwise a chromatic aberration would occur between images generated in the individual color channels which would misalign, [for the high-resolution images], the data of the two-dimensional detectors for each scanning position, which is displaced in steps which are small in relation to the diameter of the illumination spot. Only when the two-dimensional detectors are aligned with the optical axis accurately to a subpixel level in all color channels one can superimpose the images of the individual color channels.

SUMMARY OF THE INVENTION

The object of the invention is therefore to develop a method and a microscope of the type mentioned initially in such a way that color information can be obtained and at the same time the adjustment necessary for several color channels is reduced or even dispensed with.

This object is achieved according to the invention by a method for high-resolution scanning microscopy of a sample, wherein the sample is excited by illumination radiation to emit fluorescent radiation, wherein the illumination radiation is focused to a point in or on the sample to form a diffraction-limited illumination spot, the point is imaged to a diffraction image on a spatially resolving two-dimensional detector in a diffraction-limited manner, wherein the two-dimensional detector has a spatial resolution which resolves a diffraction structure of the diffraction image, the point is displaced into various scanning positions relative to the sample with an increment which is smaller than half a diameter of the illumination spot, the two-dimensional detector is read and an image of the sample with a resolution which is increased beyond a resolution limit of the imaging is generated from data of the two-dimensional detector and from the scanning positions assigned to these data, wherein, for the purposes of discriminating between at least two predetermined wavelength ranges in the fluorescent radiation of the sample, a number of Airy disks with the number corresponding to the at least two predetermined wavelength ranges are generated on the two-dimensional detector by means of a spectrally selective element, which Airy disks are offset laterally from one another such that the diffraction image consists of the mutually offset Airy disks, wherein the Airy disks lie completely on the two-dimensional detector and the Airy disks are evaluated when generating the image of the sample.

The object is further achieved by a microscope for high-resolution scanning microscopy, the microscope comprising a sample space for receiving a sample which can be excited to emit fluorescent radiation, a lens system comprising a focal plane lying in the sample space and a resolution limit, an illumination device comprising an input for receiving illumination radiation and illuminating the sample space with the illumination radiation via the lens system, wherein the lens system focuses the illumination radiation to a diffraction-limited illumination spot at a point in the focal plane to form, an imaging apparatus for imaging the point in the focal plane to a diffraction-limited manner through the lens system to a diffraction image on a spatially resolving two-dimensional detector which lies in a detector plane conjugate with the focal plane, wherein the two-dimensional detector has a spatial resolution which resolves a diffraction structure of the diffraction image, a scanning device for displacing the point into various scanning positions with an increment which is smaller than half a diameter of the illumination spot, an evaluation device for reading the two-dimensional detector, for evaluating the diffraction structure of the diffraction image from data of the two-dimensional detector and from the scanning positions assigned to these data and for generating an image of the sample with a resolution which is increased beyond the resolution limit, wherein, for the purposes of discriminating between at least two predetermined wavelength ranges in the fluorescent radiation of the sample, the microscope comprises a spectrally selective element which generates a number of Airy disks corresponding to the at least two predetermined wavelength ranges on the two-dimensional detector, which Airy disks are offset laterally from one another such that the diffraction image consists of the mutually offset Airy disks, wherein the two-dimensional detector and the spectrally selective element are formed such that the Airy disks lie completely on the two-dimensional detector, and the evaluation device evaluates the Airy disks when generating the image of the sample.

The invention simultaneously achieves an increase in resolution and spectral image information from only one two-dimensional detector in that the diffraction image is split on the detector into at least two Airy disks which are displaced with respect to each other. A spectrally selective element is used for this. One wavelength range (also referred to as color channel) is assigned to each Airy disk.

The method and the microscope thus make it possible to discriminate between at least two wavelength ranges. As in LSM, the image of the sample is obtained by scanning the sample with the spot and taking a plurality of individual image-frames which each are assigned to a particular scanning location, that is a particular scanning position.

Diffraction of an optical beam at a circular aperture generals an Airy disk. A central maximum, the Airy disk, appears that is surrounded by rings of lower and decreasing intensity of radiation. Even a microscope which is perfect according to the laws of geometrical optics, i.e., is without imaging errors, cannot image a point precisely on a point but only to a blurred spot due to diffraction of the light at the aperture. This is referred to as diffraction-limited imaging. The same applies in the case of diffraction-limited illumination of a point. In classical geometrical optics, two points can be separated according to the so-called Rayleigh criterion when the maxima of their images in the diffraction image lie apart from each other by at least the radius r of the Airy disk. The shape of the spot depends on the shape of the aperture, in particular spot size is inversely proportional to the size of the aperture. The size of the Airy disk results from the first zero point of the Bessel function of the first kind, which is at approximately r=0.6098. The Airy disk (that is the central diffraction spot) is named after the English astronomer George Biddell Airy. In the scanning microscope the aperture is circular, and defined by the round frame of the lens system, both in illumination and in imaging. Since the size of the Airy disk also depends on the wavelength, it is smaller for diffraction-limited illumination serving as excitation radiation than for fluorescent radiation because that is Stokes shifted, i.e., has a longer wavelength.

Here, the term "diffraction-limited" is not intended to be limited to the diffraction limit according to Abbe's theory but is also intended to cover cases in which the theoretical maximum is missed by 20% because of real deficiencies or restrictions. Then too the individual image has a structure which is referred to here as diffraction structure. It is oversampled.

In order to work with as economical a detector as possible, the Airy disks overlap but do not cover each other completely in one embodiment of the invention. The overlapping area should preferably be such that the center of each Airy disk lies outside the other Airy disk(s). This means in the case of two Airy disks that the centers thereof lie on the two-dimensional detector in an area which is not covered by the other Airy disk. In the case of several Airy disks, this applies to each Airy disk. This requirement can be met particularly easily for up to four Airy disks.

The size of the detector can be kept as small as possible if the spectrally selective element is chromatical in such a way that the mutually offset Airy disks have the same size. Because of the mentioned wavelength-dependent size of Airy disks, this required that the spectrally selective element carries out a proper size correction which reduces the size of the Airy disk of a longer-wave wavelength range with respect to an Airy disk of a shorter-wave wavelength range. If such chromatic correction is not done, the Airy disks, assigned to the individual wavelength ranges have different sizes. This may preferably be compensated for by a lateral offset of neighboring Airy disks in order to isolate the centers of the Airy disks, i.e., such that they do not come to lie within another Airy disk.

The Airy disks for the wavelength ranges can be generated in different ways. In a first variant, the spectrally selective element or the spectral separation is performed in front of the two-dimensional detector and not in a part of the beam path through which also guides the illumination radiation. The imaging radiation then passes through the beam path up to the spectrally selective element which separates the diffraction image into the Airy disks of the individual wavelength. In a second variant, the spectral separation is effected in the illumination or the illumination device with the result that the imaging is not affected by the spectral separation. In this way, the illumination spot gets the shape of several Airy disks offset laterally from one another directly in the sample.

In the first variant, the spectral separation only acts on the fluorescence light of the sample. In the second variant, it only acts on the excitation of the sample. The first variant thus separates color channels of a sample fluorescing in different colors. In contrast, the second variant discriminates constituents of the sample which can be excited at different wavelength ranges. Common to both variants is that the spectrally selective element lies in a part of the beam path which is only irradiated in imaging or in illumination, but not in both. As a modification from this, it is also possible to arrange the element in a common part of the beam paths.

The core of the invention lies in discriminating between the wavelength ranges spatially via the positions of the Airy disks on the two-dimensional detector. Since the image is not moving on the two-dimensional detector (so-called de-scanned setup), the position of the Airy disks which are assigned to the individual wavelength ranges which are also referred to as color channels is known and, while the image is being generated, it is possible to un-mix the simultaneously captured wavelength ranges. In this way, a simultaneous capture of several color channels is possible by using only one single two-dimensional detector.

Since the reconstruction method according to EP 2317362 A1 utilizes plurality of measurements for each individual point in the sample, because of the scanning displacement with an increment which is smaller than the size of the illumination spot, an overdeterminacy results in the system of equations to be formulated and solved, with the result that not only the locations and intensities for the individual points are obtained with a high resolution but also the wavelength ranges, i.e., the color.

In a particularly advantageous refinement of the present invention, the position of the Airy disks which are displaced with respect to each other can be adjusted with respect to the assigned wavelength ranges by an adjustable spectrally selective element. In this way, the color channels can be adjusted such that desired wavelength ranges are discriminated.

The approach it the present invention can also be carried out in parallel for several spots at the same time, as is generally known for laser scanning microscopy. Then, several spots are scanned over the sample and the individual images of the several spots lie still in the detection plane next to each other. The following description concentrates by way of example on scanning with a single point-spot. However, this is not meant as a limitation and the features and principles explained also apply analogously to parallel scanning of several point-spots and also to the use of a line spot. The latter is, of course, only diffraction-limited to the line extension with the result that the features of this description only apply in one direction (transverse to the line extension).

Imaging of a desired area of the sample is done by scanning, as in conventional LSM. Since illumination and the imaging and the corresponding device share an optical scanning device which guides the illumination spot over the sample and, at the same time, descans the point at which the sample is imaged and which coincides with the illumination spot again in relation to the detector, a zoom lens can be placed in the common beam part of the illumination and imaging devices. This allows to match the diffraction image to the size of the two-dimensional detector and additionally to couple available illumination radiation completely and loss-less into the objective pupil, which can change when selecting a different objective.

Resolving the diffraction structure of the individual images makes additionally allows to determine a direction of movement of the spot being displaced during the scanning of the sample. Although this direction of movement is in principle known from the mechanism of the scanner (for example a scanning mirror or a movable sample stage), residual uncertainties caused by the mechanics may remain. These can be eliminated in that signals of individual pixels of the detector array are evaluated by means of cross-correlation. Here the fact is utilized that, because of the diffraction-limited imaging of the illuminated point, image pixels lying next to each other in the sample overlap to a certain extent while their centers lie next to each other. If the signals of such image pixels are subjected to a cross-correlation, a residual uncertainty which remains because of unavoidable tolerances in the scanning mechanism can be reduced or completely eliminated.

Insofar as a method is described here, a control device realizes these method steps during the operation of the microscope.

It is understood that the features named above and those yet to be explained below can be used not only in combinations described, but also in other combinations or alone without departing from the spirit and scope of the present invention.

The invention is explained in yet more detail below by way of example with reference to the attached drawings, which also disclose features essential to the invention. There are shown in:

BRIEF DESCRIPTION OF THE DRAWINGS

FIG. 2 is an enlarged representation of a two-dimensional detector which is used in the microscope of FIG. 1, FIGS. 3 to 6 are representations of diffraction images which occur on the two-dimensional detector on operating the microscope of FIG. 1 in different embodiments.

DETAILED DESCRIPTION

Figure 1:
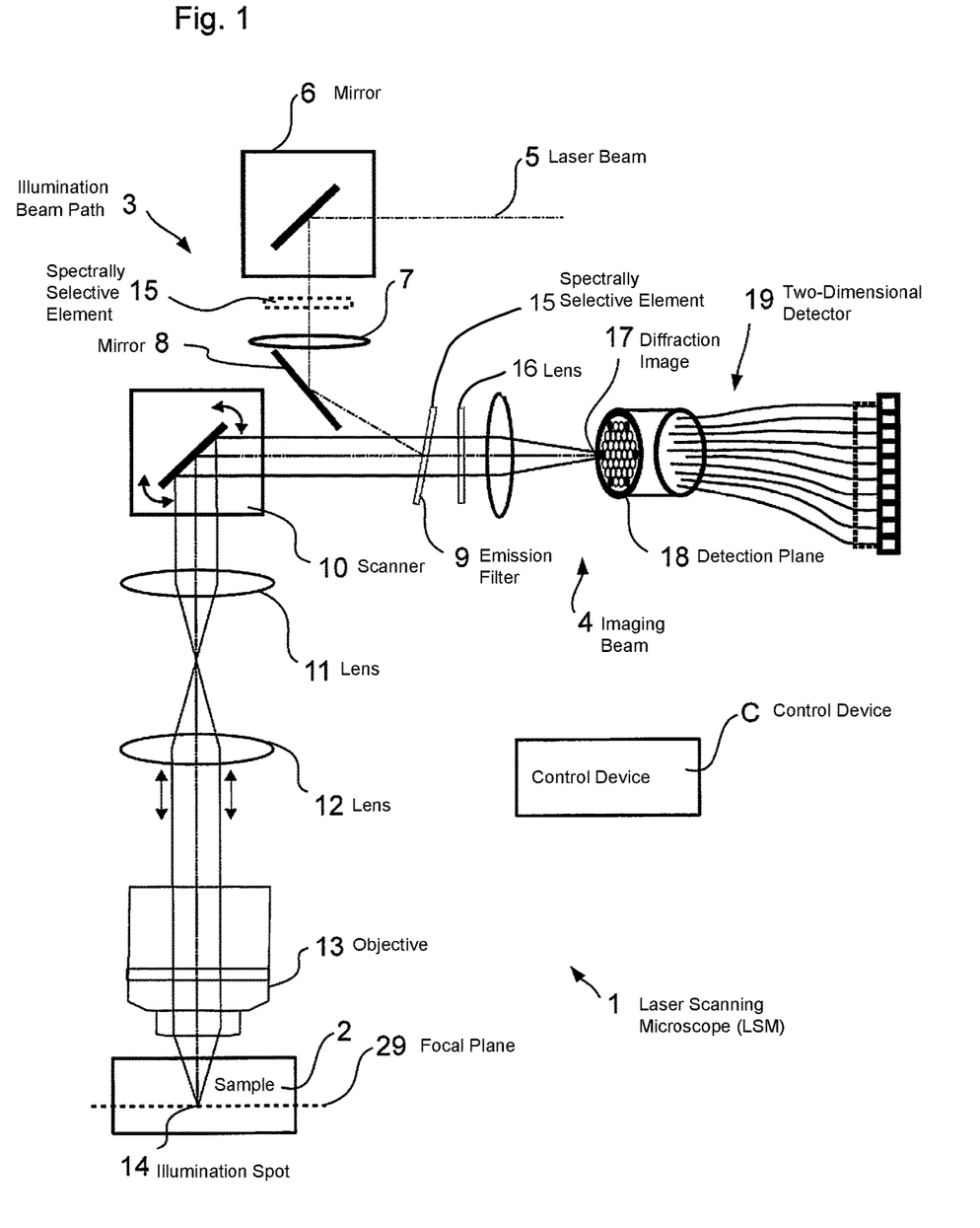
FIG. 1 is a schematic representation of a laser scanning microscope for high-resolution microscopy.

FIG. 1 shows a laser scanning microscope 1 schematically that is adapted for microscopy of a sample 2. The laser scanning microscope 1 (abbreviated to LSM in the following) is controlled by a control device C and comprises an illumination beam path 3 as well as an imaging beam path 4. The illumination beam path illuminates a spot in the sample 2 and the imaging beam path 4 images this spot in a diffraction-limited manner for detection. Illumination beam path 3 and imaging beam path 4 share a lens system.

The LSM 1 illuminates the sample 2 by means of a laser beam 5 provided which is guided to a mirror 8 via an optional deflecting mirror 6 and a lens 7. The mirror 8 ensures that the laser beam 5 is incident on a coupling-in element, e.g., an emission filter 9, under an angle of reflection. For a clearer representation, only the main axis of the laser beam 5 is shown.

After reflection at the emission filter 9, the laser beam 5 is deflected biaxially by a scanner 10 and focused by means of lenses 11 and 12 through an objective 13 as di action-limited illumination spot 14 into a focal plane 29 in the sample 2. In the representation of FIG. 1, the illumination spot 14 is punctiform, however a linear illumination spot is equally possible. Fluorescent radiation which was excited at the location (e.g., point) of the illumination spot 14 is guided out of the focal plane 29 back to the scanner 10 via the objective 13, the lenses 11 and 12, after which a not moring light beam is present in the imaging direction again. This beam passes through the emission filter 9, which here additionally has the function of selecting the fluorescent radiation in the illumination spot 14 with respect to its wavelength and blocking the illumination radiation of the laser beam 5, which serves, for example, as excitation radiation. A lens 16 ensures that in the end the location of the illumination spot 14 is imaged to a diffraction-limited diffraction image 17 which lies in a detection plane 18. The detection plane 18 is a plane conjugate with the focal plane 29, in which the illumination spot 14 lies in the sample 2.

The diffraction image 17 of the illumination spot 14 is captured in the detection plane 18 by a two-dimensional detector 19, an exemplary design of which is explained in more detail below with reference to FIG. 2. Essential here is that in the detection plane 18 the two-dimensional detector 19 resolves the diffraction-limited image 17 of the spot 14 spatially, therefore brings about an oversampling.

The control device C controls all of the components of the LSM 1, in particular the scanner 10 and the two-dimensional detector 19. The control device captures the data of each individual images 17 for different scanning positions, analyzes the diffraction structure of each image and generates a high-resolution overall image of the sample 2.

The LSM 1 of FIG. 1 is shown in an embodiment using a single illumination spot 14 which is scanned on the sample. However, embodiments can also be used for scanning according to a line illumination spot, e.g., extending perpendicularly to the plane of drawing of FIG. 1. It is also possible to design the LSM 1 of FIG. 1 in such a way that several point illumination spots in the sample lying next to each other are scanned. The corresponding diffraction images 17 then likewise lie next to each other in the detection plane 18. The two-dimensional detector 19 is then properly designed in order to detect the diffraction images 17 lying next to each other in the detection plane 18.

Figures 2, 3, 4:
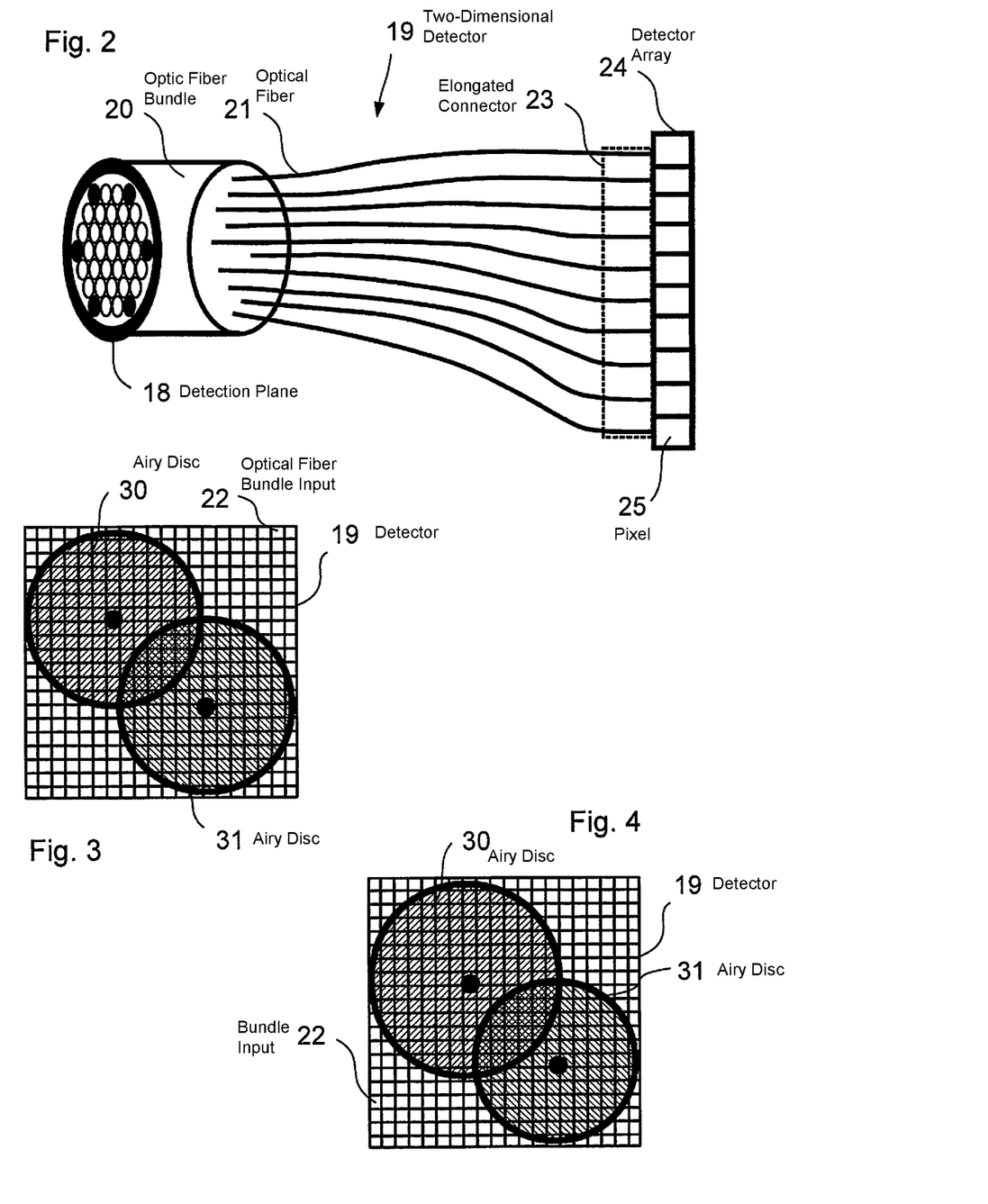

FIG. 2 shows an enlarged view of the two-dimensional detector 19. It features of an optical fiber bundle 20, which feeds a detector array 24. The optical fiber bundle 20 is made up of individual optical fibers 21. The ends of the optical fibers 21 form the optical fiber bundle input 22 and lie in the detection plane 18. The individual ends of the optical fibers 21 thus represent pixels, with which the diffraction image 17 of the illumination spot 14 is captured. Since in the embodiment of FIG. 1 the illumination spot 14 is a point spot by way of example, the diffraction image 17 is an Airy disk, the extending within the circle illustrating the detection plane 18 in FIGS. 1 and 2. It is to be mentioned that FIG. 1 contains a simplification in this respect. The extent of the optical fiber bundle input 22 is so large that it covers the extent of the diffraction image. At their outputs the individual optical fibers 21 in the of optical fiber bundle 20 are re-arranged to a geometrical arrangement differing from the arrangement at the optical fiber bundle input 22, namely in the shape of an elongated connector 23, in which output-side ends of the optical fibers 21 lie next to each other. The connector 23 is formed to match a geometrical arrangement of a detector row 24, i.e., each output-side end of an optical fiber 21 lies exactly in front of a pixel 25 of the detector row 24.

It is to be mentioned that the design of the two-dimensional detector 19 according to FIG. 2 is purely by way of example. In principle, it is sufficient for the microscope 1 to have one two-dimensional detector 19 which oversamples in the detection plane 18 the diffraction image 17 which the diffraction-limited imaging of the point illuminated by the illumination spot 14 generates in the focal plane 29. In particular, the two-dimensional detector 19 can also be a rectangular detector surface in the detection plane 18, as is the case in FIGS. 4 to 6 described below.

In the description of the microscope 1, the element 15 has not yet been mentioned. It is a spectrally selective element which is arranged in the imaging device 4 or in the illumination device 3. For the arrangement in the illumination apparatus 3 FIG. 1 shows the spectrally selective element by dashed lines only. In the following, first of all the effect and arrangement of the spectrally selective element 15 in the imaging device 4 are explained.

Without spectrally selective element 15 the diffraction-limited imaging in the focal plane 29 of the point illuminated by the illumination spot 14 would yield, a diffraction image 17 in the assigned conjugate detection plane 18, which image is an Airy disk because of the circular aperture of the objective 13. The formation of such Airy disks has already been explained in the general part of the description. In the case of microscopy as described in EP 2317362 A1, the structure of the diffraction image 17 is analyzed by oversampling and, in connection with the scanning positions which have an increment which is small compared with the minimum dimension of the illumination spot 14, a structure determination is made which goes beyond the resolution limit of the diffraction-limited imaging. To understand this, one may look at two locations which lie so close to each other in the focal plane 29 that they cannot be resolved within diffraction-limited resolution. When scanning the illumination spot 14 at increments which are small compared with the diameter of the (in this theoretical experiment circular) illumination spot, one of the two locations enters the illumination spot first. The radiation intensity in the diffraction image 17 increases the further this first location goes into the illumination spot 14. Because of its diffraction-limited properties, the illumination spot 14 has an intensity which increases towards the center. The intensity of the radiation in the diffraction image 14 thus increases to the extent that the observed first location advances more and more into the center of the illumination spot 14. When the observed location has passed over and away from the center of the illumination spot 14, the intensity of the radiation coming from this first position decreases again. If the theoretically assumed second location was not adjacent, the radiation intensity in the diffraction image 17 would fade away again, wherein the rise and fall of the radiation intensity in the diffraction image 17 correlates exactly with the course of the illumination intensity of the illumination spot 14 (taking into account the increment and the fluorescence sensitivity of the first location). Since, however, a second location is present in close proximity, this second location likewise begins to contribute fluorescent radiation to the diffraction image 17, and in fact more the closer the second location is to the center of the illumination spot 14. Apart from that, exactly the same applies to the second location, of course, as applies to the first location. As a result, illumination intensities in the diffraction image 17 are obtained for the step positions, which are different from intensities occurring if only a single fluorescing location were present. Through evaluation of data of the two-dimensional detector 19 and taking into account the actual scanning position, it can thus be mathematically determined that and at what spacing two locations were fluorescing in the focal plane 29 although these two locations could not have been resolve within diffraction-limited resolution. A person skilled in the art, knows realizations to evaluate the data of the two-dimensional detector 19 for each scanning position in which, an equation is formulated which contains several unknowns, in particular the intensity and spacing of the locations in the focal plane 29. Due to the plurality of scanning positions, a system of equations is obtained which is overdetermined and enables the radiation intensity and spacing, i.e., thus also the position, of the fluorescing positions to be calculated. This will be explained below.

This principle of high-resolution microscopy is now improved with the microscope 1 to the effect that the spectrally selective element 15 changes the diffraction image 17 in the detection plane 18, which is conjugate with the focal plane 29, such that, for two wavelength ranges (color channels), two Airy disks are forming which are displaced with respect to each other. The diffraction image as now obtained according to the situation shown in FIG. 3. On the two-dimensional detector 19, which is drawn by way of example as a square array of pixels 22, lie two Airy disks 30, 31 displaced with respect to each other, wherein the first Airy disk 30 is assigned to a first color channel and the second Airy disk 31 is assigned to a second color channel. The wavelength ranges of these color channels are defined by the spectrally selective element which is therefore chosen, in an embodiment, to match predetermined color channels (wavelength ranges). In an embodiment, the Airy disks 30, 31 are offset with respect to each other such that their centers (marked by large round dots) lie outside the overlapping area of the respectively other Airy disk.

The combination of the Airy disks 30 and 31 is the diffraction image 17, i.e., the Airy disks do not move spatially during microscopy. The diffraction image 17 which was a single Airy disk in the microscope according to EP 2317362 A1 is now replaced by the two Airy disks 30 and 31.

If two locations lying in the focal plane 29 and spaced so close to each other that they could not be resolved by diffraction-limited imaging per se are again viewed, the following behavior arises in the microscope 1 because of the spectrally selective element 15, if it is assumed that the first position fluoresces in the first color channel to which the Airy disk 30 is assigned and the second position fluoresces in the second color channel to which the Airy disk 31 is assigned: as soon as the illumination spot 14 covers the first location, the first Airy disk 30 starts to light up in the diffraction image 17. In contrast, the second Airy disk 31 stays dark since no radiation comes into the second color channel, as long as the second position is not also illuminated by the illumination spot 14. The intensity in the Airy disk 30 increases until the first position is covered by the center of the illumination spot 14. The intensity in the Airy disk 30 of the first color channel is then at a maximum. The same applies to the Airy disk 31 and the second color channel as well as the second position. As a result, as the two locations are surest by the illumination spot 14, a brightening and fading again of the first Airy disk 31 and a brightening and fading of the second Airy disk 31 occurring somewhat later in time are observed.

The evaluation of the data of the two-dimensional detector 19 in combination with the scanning positions thus enables an equation to be formulated for each scanning position which includes not only the position and fluorescence intensity of the two positions but also a statement about whether the first or second location limits in the first or second color channel (the assignment is not already known in advance). The plurality of scanning positions again results in an overdetermined system of equations which also enables to additionally assign the emitting locations to one of the two color channels.

In this way, the microscope 1 and the assigned microscopy method discriminates between two wavelength ranges (color channels) in the high-resolution image and obtains a two-color image without additional detectors needed.

It is emphasized that the spacing between the Airy disks 30 and 31 remains constant during the microscopy, in particular the spacing does not scale any color information. It only ensures that the Airy disks 30 and 31 do not lie completely over each other spatially because they could not be discriminated otherwise.

It is, of course, possible to separate Airy disks such that they do not overlap. However a comparatively larger detector is needed, then.

In the embodiment of the spectrally selective element 15 shown in FIG. 3, the Airy disks 30 and 31 have the same diameter. In the general part of the description it was mentioned, however, that the size of an Airy disk depends on the wavelength. It would therefore in fact be expected that the shorter-wave Airy disk (for example Airy disk 30) would have to have a larger diameter than the longer-wave Airy disk (for example Airy disk 31). This situation is also present in FIG. 4. It is not the case in FIG. 3 since the spectrally selective element 15 generates a chromatic compensation during the splitting of the radiation which ensures that the Airy disks 30 and 31 are the same size in spite of their different color channels.

Figure 5:
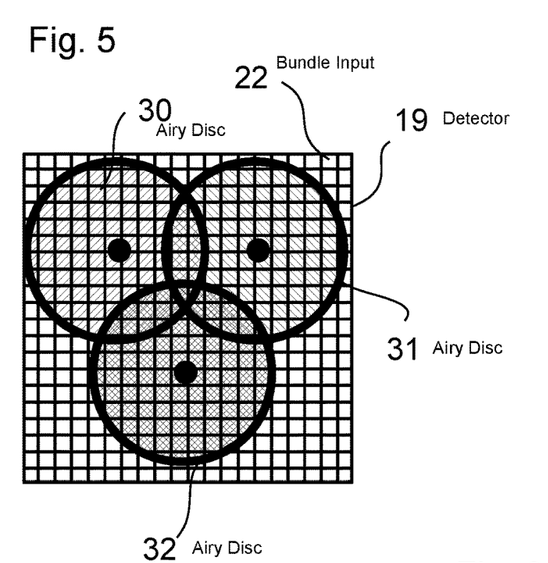
Figure 6:
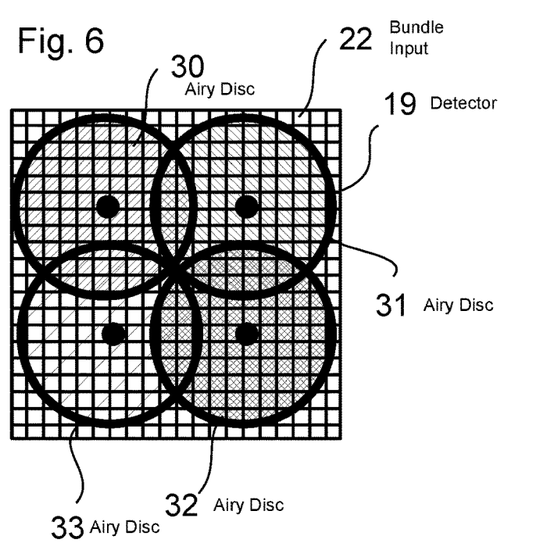

The described approach is not only limited to the use of two wavelength ranges (color channels). FIG. 5 shows an arrangement with a third color channel 31, and in FIG. 6 further a fourth color channel 33 exists. The explanations given in the generic pact of the description equally applies here in the same way. Several color channels are possible because, the obtained system of equations is overdetermined due to the plurality of scanning positions to such extent that there is leverage for further unknowns, e.g., color channels.

In the description hitherto it was assumed that the spectrally selective element 15 is in the imaging device 4 and, thus, in a part of the beam path which acts exclusively for the imaging. In other words, in this embodiment the spectrally selective element 15 is not penetrated by illumination radiation. The color channels, which are generated by the spectrally selective element 15 through the displacement of the Airy disks with respect to each other, are thus color channels of the fluorescing sample. These embodiments of the microscope or microscopy method discriminate the fluorescing radiation with respect to its wavelength range (color channel).

Figure 7:
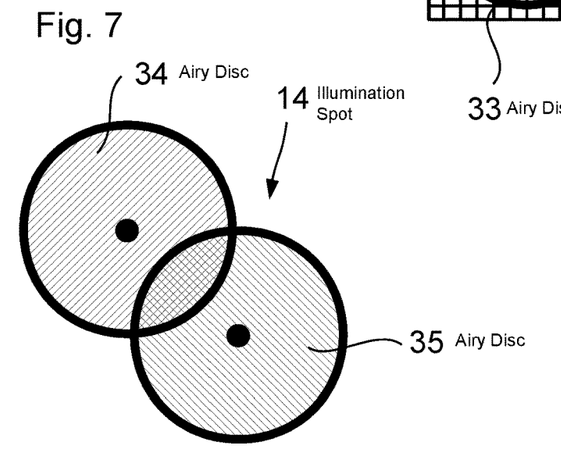
FIG. 7 depicts representations of an illumination diffraction image which can occur on illumination of a sample in an embodiment of the microscope of FIG. 1.

However, the spectrally selective element 15 can also be arranged in the illumination devices 3. This arrangement is drawn in FIG. 1 with a dashed line. The spectrally selective element then lies in an area of the beam path which is exclusively penetrated by illumination radiation; it thus acts not on the imaging but on the illumination only. The spectrally selective element 15 then splits the illumination spot 14 into two illumination Airy disks 34, 35, as FIG. 7 shows. The spectrally selective element 15 in the illumination beam path thus creates illumination color channels, whereas the arrangement of the spectrally selective element 15 in the imaging beam path generated detection color channels. The sample is thereby no longer illuminated by, e.g., one Airy disk, but by two illumination Airy disks 34 and 35 offset with respect to each other. As a result, a situation is thus also obtained on the two-dimensional detector 19 as in FIG. 3. However the Airy disks 30 and 31 now no longer correspond to different color channels of the fluorescent radiation, i.e., fluorescence response of the sample 2, but instead to different color channels of the excitation, i.e., fluorescence sensitivity of the sample 2. Otherwise, all of the variants which were explained with reference to FIGS. 3 to 6 for the arrangement of the spectrally selective element 15 in the imaging apparatus 4 can also be used in the same way for the alternative arrangement of the spectrally selective element 15 in the illumination device 3. However, because of the different geometrical position, the design of the spectrally selective element 15 in the arrangement in the imaging device 4 will generally look different than in the arrangement in the illumination device 3. In principle, a plurality of elements which have a chromatic effect come into question for the spectrally selective element 15, for example a wedge, a prism, a mirror or a doublet lens.

In a variant from the above-named alternatives, the spectrally selective element 15 can also be placed in a part of the beam path which is passed through both by the illumination and also by the imaging, or two spectrally selective elements 15 are used. In this way, crosstalk during the simultaneous excitation of two dyes by one wavelength can be suppressed. In addition, this opens possibilities for calibration measurements.

By arranging the spectrally selective element 15 in the illumination device 3, a case can arise where, on illumination by two or more illumination color channels, the shorter illumination wavelength stimulates a fluorescence signal in the wavelength range of fluorescence stimulated by the longer-wave illumination. The consequence of this would be that one of the structures would again appear as a displaced shadow image. By means of a suitable correlation calculation, the shadow image part can be determined and eliminated.

The embodiment according to FIGS. 3 and 4 shows that it is preferable to carry out the displacement of the Airy disks along the diagonal of the two-dimensional detector 19 since then its surface can be used to the maximum.

On using a two-dimensional detector 19 with optical fibers, as is shown by way of example in FIG. 2, it is preferable to lay the fibers such that the non-overlapping areas of the two Airy disks are guided to detector elements which, as far as possible, do not lie next to each other, i.e., the non-overlapping areas of the Airy disk 30 are guided to a first group of detector elements and the non-overlapping areas of the Airy disk 31 are guided to a second group of detector elements, wherein the two groups are, as far as possible, not interleaved with each other.

To explain the mathematical analysis of the formulation of the system of equations more precisely an introduction first considered, the case of only one color, i.e., without spectrally selective element 15. If the object is identified with O(r), the point spread function (PSF) of the excitation with E(r) and the PSF of the detection with H(r), signal D(r,p) for each pixel is obtained the following equation, wherein r denotes the spacing from the location p of the illumination spot:

$$D(r, p) = \int_r O(p - r')E(r')H(r' + r)dr' \quad (1)$$

A Fourier transformation of D(r,p) with respect to the location p gives:

$$D(r,\omega) = O(\omega)FT_{r'}\{E(r')H(r'+r)\} \quad (2)$$

The product in the real domain gives the following convolution in the Fourier domain:

$$D(r, \omega) = O(\omega) \int_\omega E(\omega')H(\omega - \omega')e^{i(\omega-\omega')r}d\omega'$$

If a support function is introduced at the location r:

$$EH(r,\omega) = FT_{r'}\{E(r')H(r'+r)\} \quad (4)$$

the following equation (2) results $$D(r,\omega) = O(\omega)EH(r,\omega) \quad (5)$$

Different locations r on the two-dimensional detector are combined by means of a Wiener filter $$\tilde{O}(\omega) = \frac{\sum_r D(r, \omega)EH^*(r, \omega)}{\langle |n(\omega)|^2 \rangle / \langle |O(\omega)|^2 \rangle + \sum_r |EH(r, \omega)|^2}, \quad (6)$$

wherein $\langle |O(\omega)|^2 \rangle$ and $\langle |n(\omega)|^2 \rangle$ are the corresponding spectral power densities of the signal ("O") and of the noise (n).

Having said this, the following weightings predetermined by the PSF are obtained for several color channels which are mixed at each pixel of the two-dimensional detector 19:

$$D(r, \omega) = \sum_c O_c(\omega)EH_c(r, \omega) \quad (7)$$

In this equation, c is the color channel index. If the equation (7) is written as a matrix, we obtained:

$$[D(r,\omega)]_r = [O_c(\omega)]_c [EH_c(r,\omega)]_{c,r} \quad (8)$$

If additional noise is taken into consideration, equation (8) takes the following form:

$$[\tilde{D}(r,\omega)]_r = [O_c(\omega)]_c [EH_c(r,\omega)]_{c,r} + [N(r,\omega)]_r \quad (9)$$

The object $[O_c(\omega)]_c$ can be obtained by means of an operator $[G_c(r,\omega)]_{r,c}$, which combines frequency filtering and color channel un-mixing:

$$[O_c(\omega)]_c = [G_c(r,\omega)]_{r,c} [\tilde{D}(r,\omega)]_r \quad (10)$$

As in deriving the Wiener filter, the quadratic spacing between the reconstructed and the actual object must now be minimized for each frequency and each color channel:

$$E|[O_c(\omega)]_c - [\tilde{D}(r,\omega)]_r [G_c(r,\omega)]^{r,c}|^2 = \min \quad (11)$$

By using equation (9), the following is thus obtained:

$$E|\{[O_c(\omega)]_c[EH_c(r,\omega)]_{c,r} + [N(r,\omega)]_r\}[G_c(r,\omega)]_{r,c} - [O_c(\omega)]_c|^2 = \min \quad (12)$$

Using the same principles as in deriving the Wiener filter, which are known to a person skilled in the art, for example, from http://en.wikipedia.org/wiki/Wiener_deconvolution, the following is obtained:

$$[O_c(\omega)]_c = [D(r,\omega)]_r \{[EH_c(r,\omega)]_{c,r}*[I]_c[EH_c(r,\omega)]_{c,r} + [\sigma^2]_r\}^{-1}[EH_c(r,\omega)]_{c,r}*[I]_c \quad (13)$$

Herein, $[I]_c$ and $[\sigma^2]_r$ are the spectral power densities of the signal for each color channel and the noise:

$$[I]_c = E|[O_c(\omega)]_c|^2; [\sigma^2]_r = E|[N(r,\omega)]_r|^2 \quad (14)$$

When the emission spectra of fluorophores overlap it can be that, in one color channel, shadows of an object arise from the other color channel. Such shadow images are distorted by the same detection PSF as the main image in the actual color channel. An image detected in the channel c, $O_c(\omega)$ is therefore an overlay of the images $O_c^{TRUE}(\omega)$ corresponding to the objects assigned to the different color channels:

$$[O_c(\omega)]_c = [M]_c [O_c(\omega)]_c \quad (15)$$

Here, $[M]_c$ is a un-mixing matrix. In the case, for example, of two colors, the following is then obtained:

$$\begin{cases} O_1(\omega) = m_{11}O_1^{TRUE}(\omega) + m_{12}O_2^{TRUE}(\omega) \\ O_2(\omega) = m_{21}O_1^{TRUE}(\omega) + m_{22}O_2^{TRUE}(\omega) \end{cases} \quad (16)$$

Obtaining the true images $O_c^{TRUE}(\omega)$ is simple when their mixing matrix $[M]_c$ is known. If this is not the case, it can be obtained by minimizing a cross-correlation between the generated images, i.e., the matrix is to be determined such that its values ensure the lowest cross-correlation for the best segregated objects.

The invention claimed is:
1. A microscope for high-resolution scanning microscopy, the microscope comprising:
 a sample space for receiving a sample which can be excited to emit fluorescent radiation,
 a lens system comprising a focal plane lying in the sample space and a resolution limit,
 an illumination device comprising an input for receiving illumination radiation and illuminating the sample space with the illumination radiation via the lens system, wherein the lens system focuses the illumination radiation to a diffraction-limited illumination spot at a point in the focal plane,
 an imaging apparatus for imaging the point in the focal plane to a diffraction-limited manner through the lens system onto a spatially resolving two-dimensional detector which lies in a detector plane conjugate with the focal plane,
 wherein the imaging apparatus comprises a spectrally selective element which generates at least two diffraction disks on the detector at the same time with each diffraction disk corresponding to an individual predetermined wavelength range and the diffraction disks being offset laterally from one another on the detector and overlapping with each other but not covering each other completely, wherein an intensity distribution within each diffraction disks does not depend on wavelength, and wherein the two-dimensional detector has a spatial resolution which resolves a diffraction structure of the at least two diffraction disks, a scanning device for displacing the point into various scanning positions with an increment which is smaller than the diameter of the illumination spot, an evaluation device for reading the two-dimensional detector, for evaluating the diffraction structure of the at least two diffraction disks from data of the two-dimensional detector and from the scanning positions assigned to the data and for generating an image of the sample with a resolution which is increased beyond the resolution limit, wherein for the purposes of discriminating between at least two predetermined wavelength ranges in the fluorescent radiation of the sample, the microscope comprises the spectrally selective element which generates the at least two diffraction disks corresponding to the at least two predetermined wavelength ranges on the two-dimensional detector, the at least two diffraction disks being offset laterally from one another such that the diffraction image consists of the at least two diffraction disks mutually offset from one another, wherein the two-dimensional detector and the spectrally selective element are formed such that the Airy disks lie completely on the same two-dimensional detector at the same time, and wherein the evaluation device analyzes image data of each of the at least two diffraction disks when generating the image of the sample.

2. The microscope according to claim 1, wherein the spectrally selective element spaces the at least two diffraction disks apart on the two-dimensional detector such that the center of each of the at least two diffraction disks lies outside the other of the at least two diffraction disks.

3. The microscope according to claim 1, wherein the spectrally selective element is chromatically corrected in such a way that the at least two mutually offset diffraction disks have the same size.

4. The microscope according to claim 1, wherein the spectrally selective element is arranged in the illumination device but not in the lens system which also acts for the imaging with the result that the illumination spot consists of at least two illumination diffraction disks which are offset laterally from one another.

5. The microscope according to claim 1, wherein the spectrally selective element is arranged in the imaging device but not in the lens system which also acts for the illumination.

6. The microscope according to claim 1, wherein the scanning device is a sample stage for shifting the sample in the sample volume.

7. The microscope according to claim 1, wherein the spectrally selective element comprises a grating, a prism, a wedge plate and/or a doublet lens.

8. The microscope according to claim 1, wherein the at least two diffraction disks offset laterally from one another lie in a common image plane.

9. The microscope according to claim 1, wherein a distance between the at least two diffraction disks on the detector does not scale any color information.

10. The microscope according to claim 1, wherein the evaluation device is configured:
to analyze image data of the at least two diffraction disks simultaneously by formulating a system of equations, wherein one equation is formulated for each scanning position with each equation including location, fluorescence intensity and wavelength range assignment of fluorescing position as unknown values, and
to solve the system of equations to generate the image of the sample in the wavelength ranges.

11. The microscope according to claim 1, wherein the detector comprises a detection plane and the imaging apparatus images the at least two diffraction images onto this detection plane.

12. The microscope according to claim 1, wherein each of the at least two diffraction disks comprises a center and the centers of the at least two diffraction disk are located outside a region where the at least two diffraction disks overlap.

13. The microscope according to claim 1, wherein the at least two diffraction disks have the same diameter on the detector.

* * * * *

UNITED STATES PATENT AND TRADEMARK OFFICE
CERTIFICATE OF CORRECTION

PATENT NO. : 11,204,489 B2
APPLICATION NO. : 15/502187
DATED : December 21, 2021
INVENTOR(S) : Kleppe et al.

It is certified that error appears in the above-identified patent and that said Letters Patent is hereby corrected as shown below:

On the Title Page

On page 2:
Item (56) "References Cited/U.S. PATENT DOCUMENTS", Line 17, delete "2008/0158556 A1" and insert -- 2008/0158566 A1 --, therefor.

In the Specification

In Column 8, Line 14, delete "di action-limited" and insert -- diffraction-limited --, therefor.

In Column 13, Line 67, delete "$E|[O_c(\omega)]_c-[\tilde{D}(r,\omega)]_r[G_c(r,\omega)]^{r,c}|^2=\min$" and insert -- $E|[O_c(\omega)]_c-[\tilde{D}(r,\omega)][G_c(r,\omega)]_c|^2 = \min$ --, therefor.

In Column 14, Line 10, delete "$[O_c(\omega)]_c=[D(r,\omega)]_r\{[EH_c(r,\omega)]_{c,r}*[I]_c[EH_c(r,\omega)]_{c,r}+[\sigma^2]_r\}^{-1}[EH_c(r,\omega)]_{c,r}*[I]_c$" and insert -- $[O_c(\omega)]_c = [D(r,\omega)]_r\{[EH_c(r,\omega)]_{c,r}[I][EH_c(r,\omega)]_{c,r}+[\sigma^2]_r\}^{-1}[EH_c(r,\omega)]_{c,r}[I]$ --, therefor.

In Column 14, Line 24, delete "$[O_c(\omega)]_c=[M]_c[O_c(\omega)]_c$" and insert -- $[O_c(\omega)]_c = [M]_c[O_c^{TRUE}(\omega)]_c$ --, therefor.

Signed and Sealed this
Third Day of May, 2022

Katherine Kelly Vidal
*Director of the United States Patent and Trademark Office*